US006860091B2

(12) United States Patent
Grano

(10) Patent No.: US 6,860,091 B2
(45) Date of Patent: Mar. 1, 2005

(54) APPARATUS FOR DIVIDING PASTRIES AND INSERTING DIVIDERS

(75) Inventor: Gary R. Grano, Santa Barbara, CA (US)

(73) Assignee: Foodtools, Inc., Santa Barbara, CA (US)

(*) Notice: Subject to any disclaimer, the term of this patent is extended or adjusted under 35 U.S.C. 154(b) by 2 days.

(21) Appl. No.: 10/734,062

(22) Filed: Dec. 10, 2003

(65) Prior Publication Data

US 2004/0231300 A1 Nov. 25, 2004

Related U.S. Application Data

(62) Division of application No. 10/115,324, filed on Apr. 4, 2002, now Pat. No. 6,662,529.

(60) Provisional application No. 60/325,656, filed on Sep. 26, 2001.

(51) Int. Cl.[7] ............................................. B65B 63/00
(52) U.S. Cl. ....................................... 53/514; 53/157
(58) Field of Search ........................ 53/513–520, 120, 53/157; 83/547; 30/114

(56) References Cited

U.S. PATENT DOCUMENTS

| | | | | |
|---|---|---|---|---|
| 1,975,936 A | * | 10/1934 | Goodwin | 53/518 |
| 2,023,122 A | * | 12/1935 | Chandler | 53/519 |
| 2,116,845 A | * | 5/1938 | Peck | 53/519 |
| 2,339,584 A | * | 1/1944 | Rice | 53/435 |
| 3,019,578 A | * | 2/1962 | Cohen | 53/517 |
| 3,023,557 A | * | 3/1962 | Tannehill et al. | 53/517 |
| 3,026,657 A | * | 3/1962 | Williams et al. | 53/519 |
| 3,113,530 A | * | 12/1963 | Vestermark | 53/516 |
| 4,299,148 A | * | 11/1981 | Meier | 53/516 |
| 4,565,053 A | * | 1/1986 | Browne et al. | 53/516 |
| 5,082,677 A | * | 1/1992 | Bear | 426/124 |
| 5,138,823 A | * | 8/1992 | Hartmann et al. | 53/157 |
| 5,163,865 A | * | 11/1992 | Smith | 83/956 |
| 5,819,615 A | * | 10/1998 | Dale et al. | 83/13 |
| 5,861,185 A | * | 1/1999 | Capodieci | 99/451 |
| 5,862,728 A | * | 1/1999 | Giamello | 83/13 |
| 6,032,561 A | * | 3/2000 | Lonn et al. | 83/318 |
| 6,305,146 B1 | * | 10/2001 | Gerber | 53/120 |
| 6,368,647 B1 | * | 4/2002 | Capodieci | 99/451 |
| 6,530,768 B1 | * | 3/2003 | Harrop | 83/956 |

* cited by examiner

Primary Examiner—Stephen F. Gerrity
(74) Attorney, Agent, or Firm—Gene W. Arant

(57) ABSTRACT

An apparatus for cutting separate portions of a food product and inserting dividers between adjacent portions, in which a cutting blade is ultrasonically energized during a first cutting movement, the blade is withdrawn while a divider sheet is inserted between the blade and the food item, and then the blade is driven in a second cutting movement to fold the divider sheet and to insert the thus-folded divider sheet into the cut between the two now separate portions of the food item. A particular feature of the invention is a camming mechanism to provide precise support for and folding of the divider sheet.

3 Claims, 15 Drawing Sheets

FIG. 12

CS-1000UPF I/O LIST

INPUTS:
0CH
- 00     EMERGENCY STOP
- 01     SPARE
- 02     RIGHT START BUTTON P/E SWITCH
- 03     LEFT START BUTTON P/E SWITCH
- 04     PLATFORM IN SLICING POSITION SENSOR
- 05     ULTRASONIC ALARM
- 06     SPARE
- 07     SPARE
- 08     DOOR SAFETY SWITCHES
- 09     FRONT GUARD WINDOW CLOSED SENSOR
- 10     SPARE
- 11     SPARE

1CH
- 00     BLADE UP SENSOR
- 01     BLADE REVERSAL SENSOR
- 02     DIVIDER SHUTTLE IN BACK POSITION SENSOR
- 03     DIVIDER SHUTTLE IN FORWARD POSITION SENSOR
- 04     DIVIDER FEEDER ON/OFF P/E SWITCH
- 05     DIVIDER VACUUM ADJUSTABLE SENSOR SWITCH
- 06     ULTRASONIC ON/OFF LIMIT SENSOR
- 07     CUTTING MODE SELECTOR SWITCH
- 08     DIAL IN POSITION P/E SWITCH
- 09     INDEXER END OF CYCLE P/E SWITCH
- 10     SPARE
- 11     SPARE

OUTPUTS:
10CH
- 00     SOFT START VALVE
- 01     BLADE DOWN 4-WAY
- 02     ULTRASONIC START CABLE
- 03     DO NOT USE
- 04     PLATFORM 4-WAY VALVE, OUT
- 05     PLATFORM 4-WAY VALVE, IN
- 06     INDEXER 4-WAY, RESET
- 07     SPARE

11CH
- 00     GUARD WINDOW 4-WAY VALVE, UP
- 01     GUARD WINDOW 4-WAY VALVE, DOWN
- 02     SPARE
- 03     DIVIDER SHUTTLE 4-WAY VALVE, FORWARD
- 04     AUDIBLE ALARM
- 05     BLADE SPEED CONTROL BYPASS VALVE
- 06     SPARE
- 07     SPARE

US 6,860,091 B2

APPARATUS FOR DIVIDING PASTRIES AND INSERTING DIVIDERS

PRIORITY CLAIM

This application is a division of U.S. patent application Ser. No. 10/115,324, filed Apr. 4, 2002, now U.S. Pat. No. 6,662,529, which claims priority to U.S. provisional application Ser. No. 60/325,656, filed Sep. 26, 2001.

PRIOR ART

U.S. Pat. No. 4,299,148 issued in 1981 to Meier shows the method of cutting a food item in which a sheet of wax paper is folded about the cutting edge of a guillotine blade before the blade is forced into the food item. The sheet of wax paper then remains as a separator.

U.S. Pat. No. 5,138,823 issued in 1992 to Hartman et al shows a complex machine for introducing foil-like material between slices of a food product that has, apparently, already been cut by a cutting machine. U.S. Pat. No. 4,565,053 issued Jan. 21, 1986 to Browne and Hertzberg discloses an apparatus for cutting round pastries, such as cake, and then after cutting inserting a divider between each two adjacent portions.

U.S. Pat. No. 5,862,728 issued in 1999 to Giamello shows an apparatus for cutting food products in which a cutting blade energized with ultrasonic vibrations is driven through different layers of a food product at a controlled and variable speed.

SUMMARY OF THE INVENTION

An apparatus for cutting a food item into separate portions and inserting dividers between adjacent portions, in which a cutting blade is ultrasonically energized during a first cutting movement, the blade is withdrawn while a divider sheet is inserted between the blade and the food item, and, then the blade is driven in a second movement to fold the divider sheet and to insert the thus-folded divider sheet into the cut between the two now separate portions of the food item.

According to the preferred form of the invention the blade is ultrasonically energized during at least the latter part of the second blade movement so as to effectively disengage the blade from the divider sheet.

A particular feature of the invention is a camming mechanism which allows unobstructed movement of the blade during its cutting action but also provides precise support for and folding of the divider sheet between the first and second movements of the blade.

DRAWING SUMMARY

FIG. 12 is a listing of the electrical control circuit inputs and outputs; and

DETAILED DESCRIPTION OF PREFERRED EMBODIMENT

FIGS. 1-13B

The invention in its presently preferred form is shown as being applied to cutting a cake or pastry, although the invention may in fact be applied to any of a variety of other food products.

Figure 1:
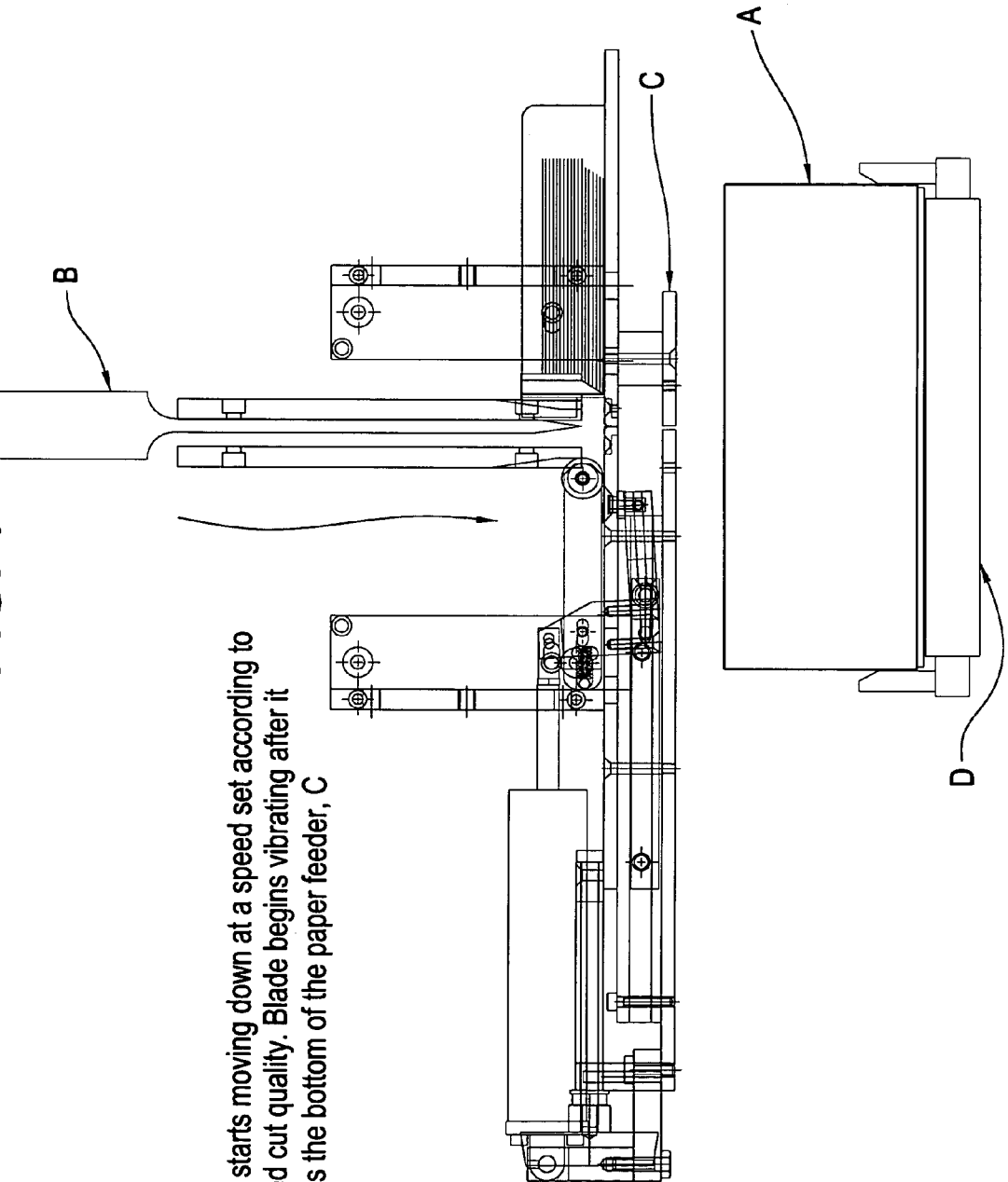
FIG. 1 is a schematic elevational view showing the presently preferred form of apparatus in accordance with the invention as the cutting blade is about to be lowered through a paper feeder into the top surface of a food item.
Figure 2:
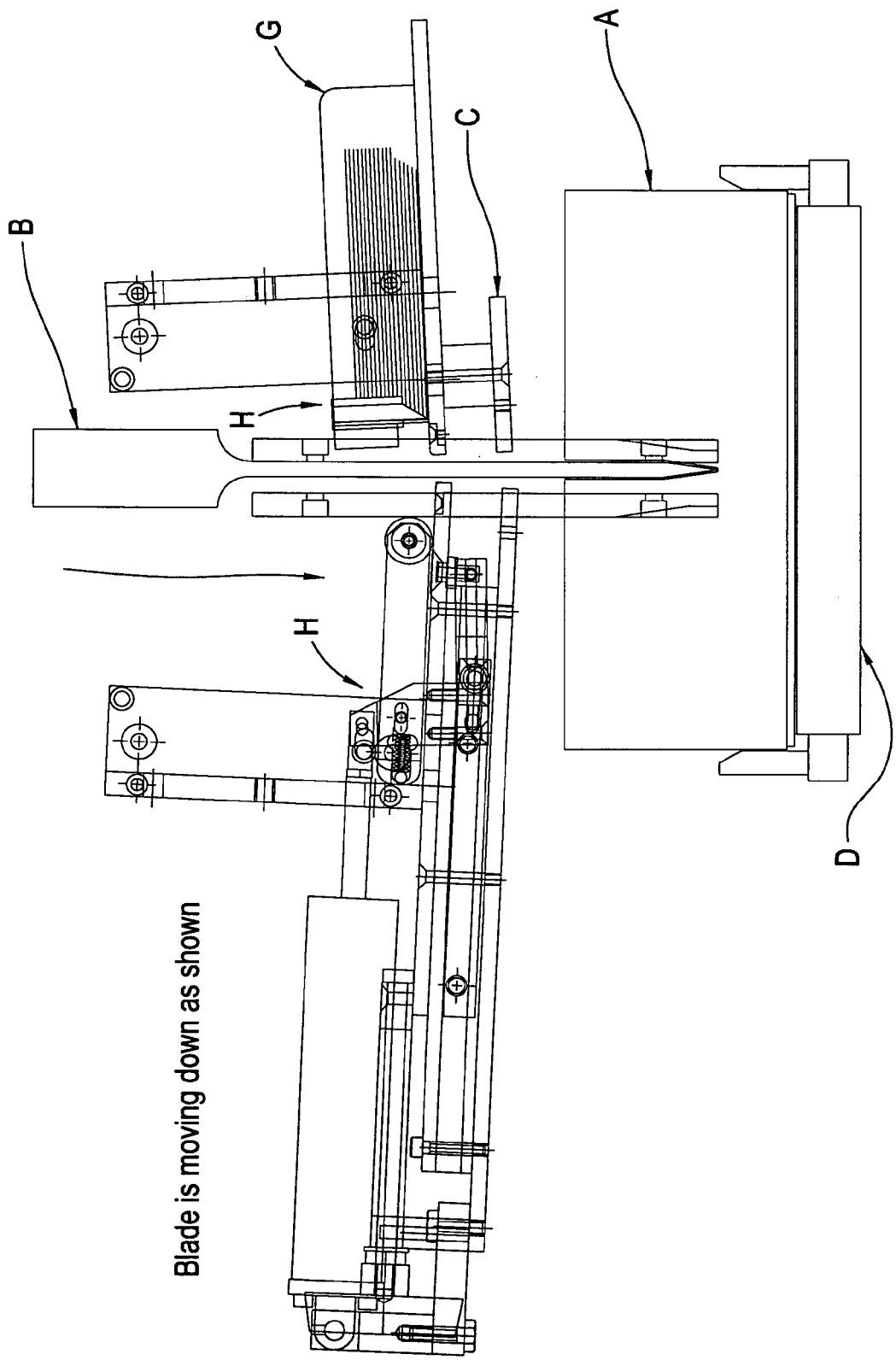
FIG. 2 is a schematic view as in FIG. 1 but showing the blade as it is vibrating and passing into the food item.
Figure 3:
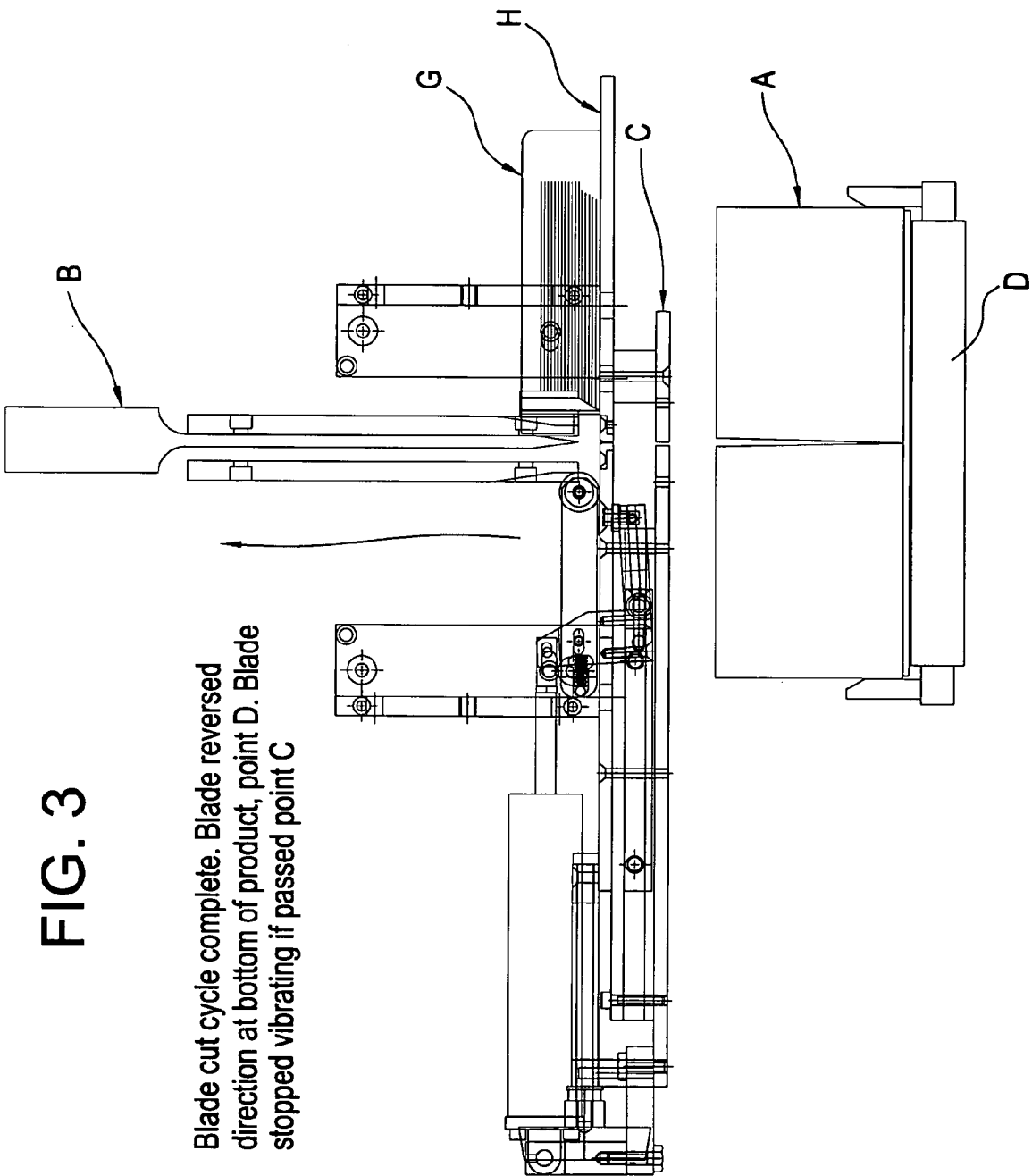
FIG. 3 is a further schematic view showing the blade in a retracted position after the first cut is completed.
Figure 9:
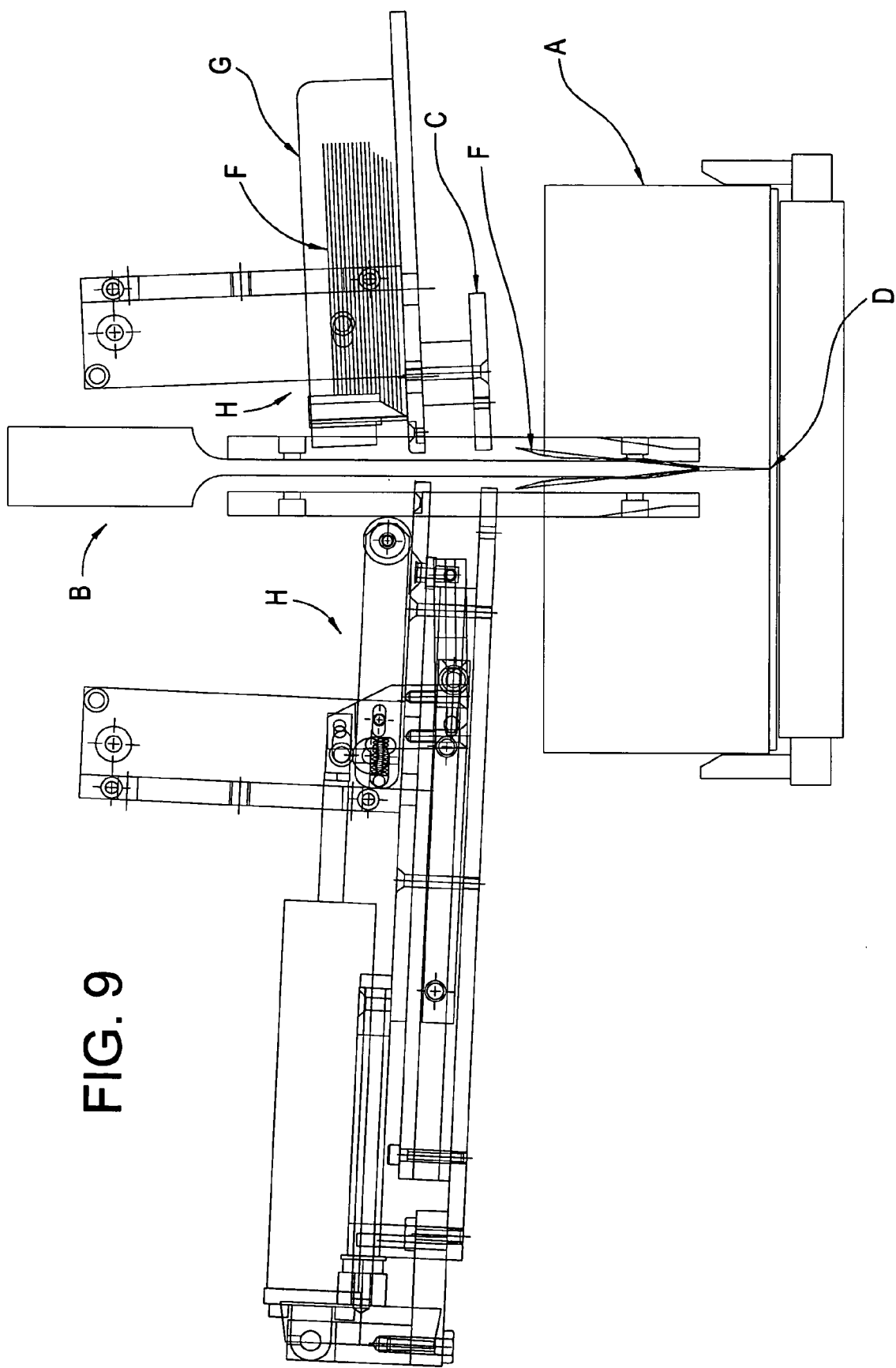
FIG. 9 is a view similar to FIG. 2 but showing the cutting blade as it drives the now-folded divider sheet into the cut previously made in the food item.
Figure 10:
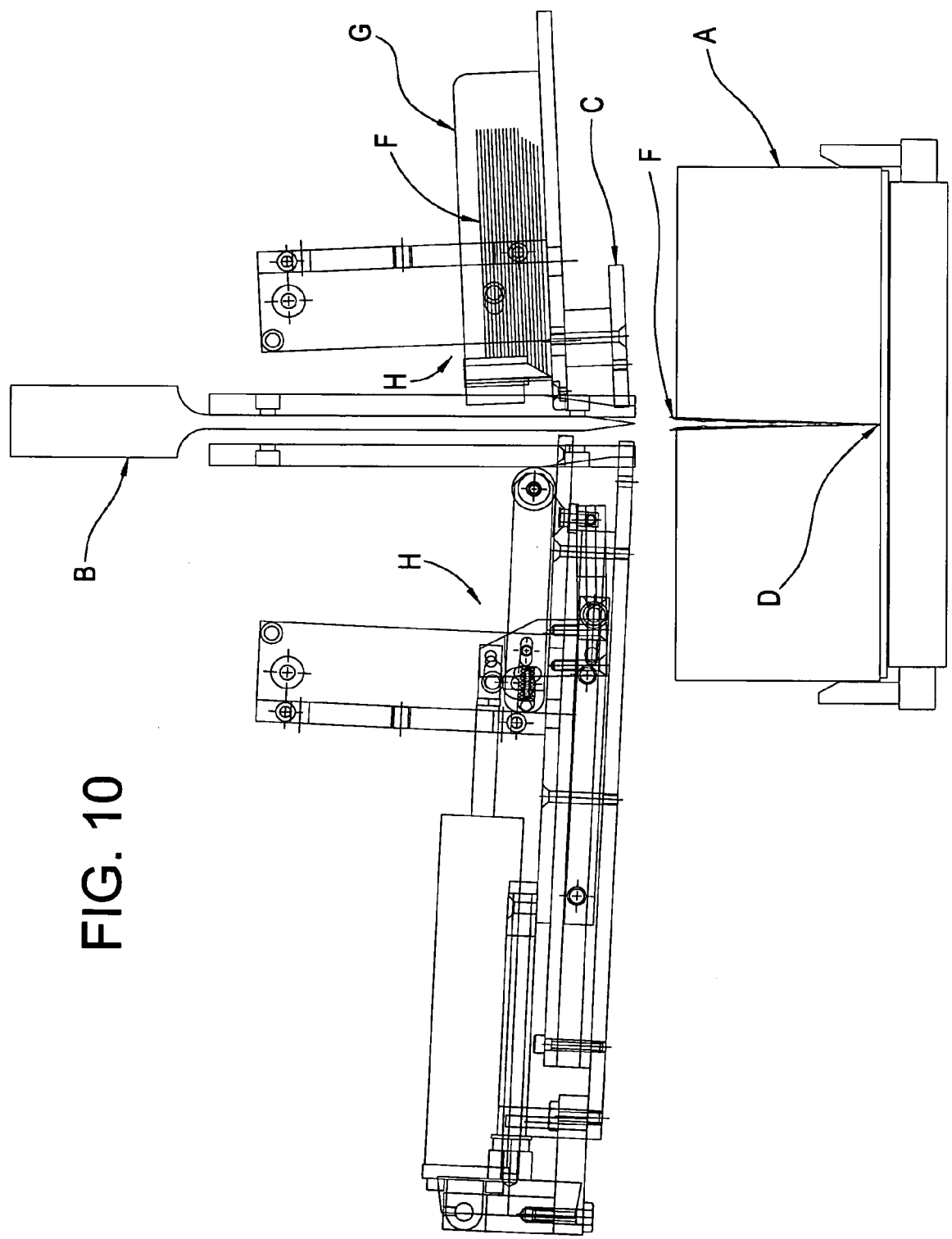
FIG. 10 is a schematic view similar to FIG. 1 but showing the cutting blade in a now upwardly retracted position after having completed insertion of the folded divider sheet into the previously made cut in the food item.
Figure 11A:
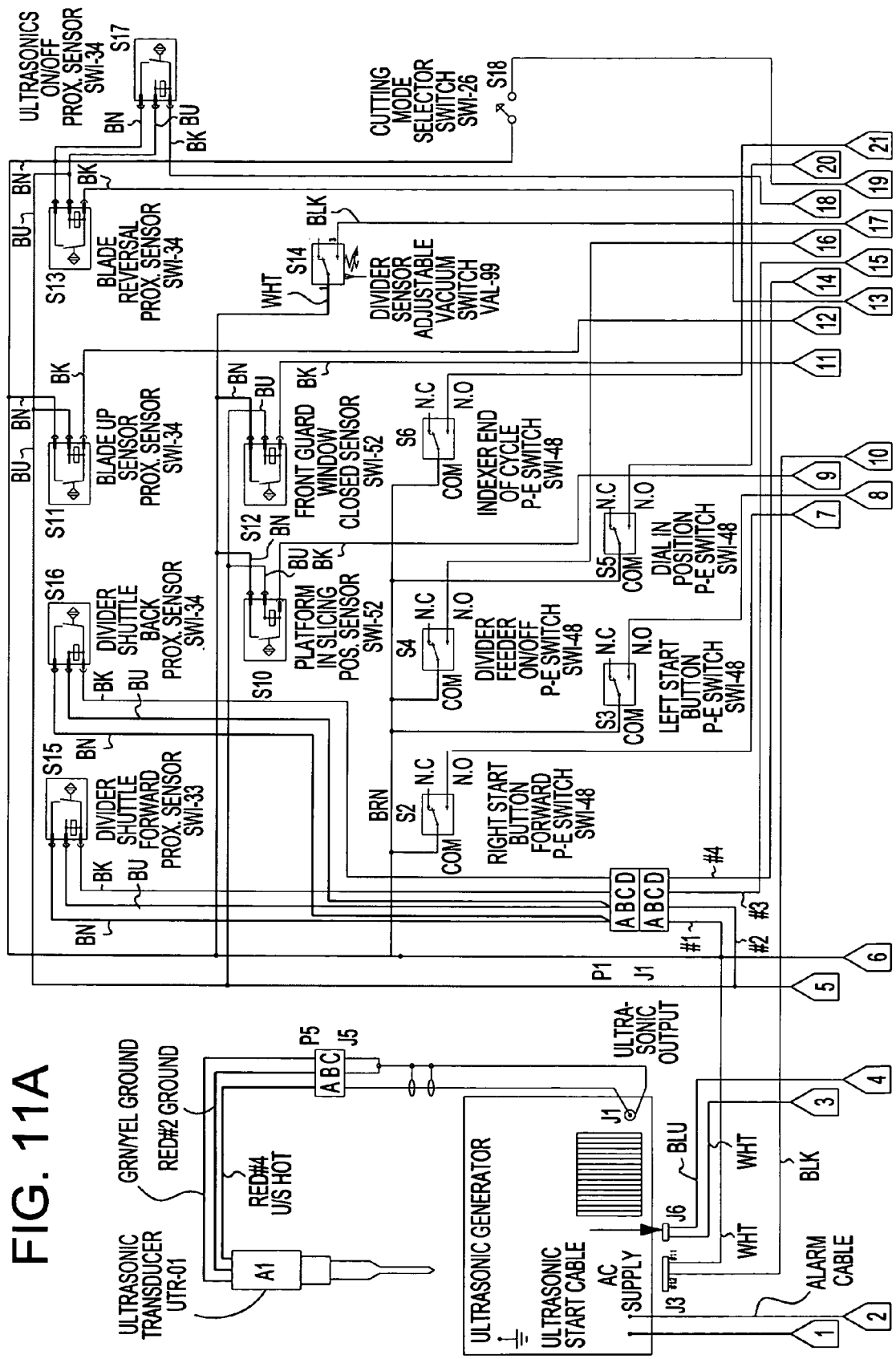
FIGS. 11A and 11B are an electrical schematic of the control and activation system for the apparatus.
Figure 11B:
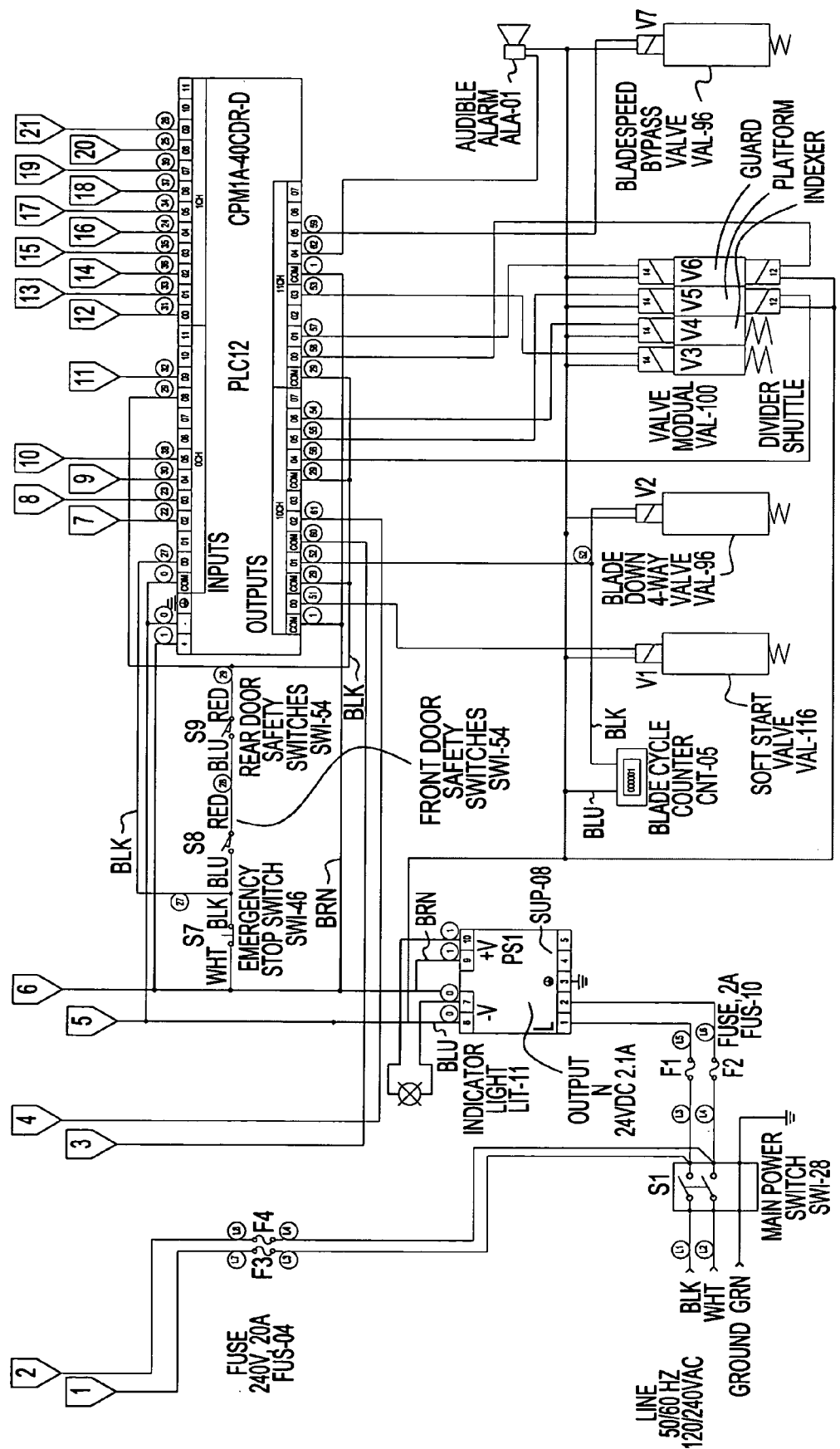
Figure 13A:
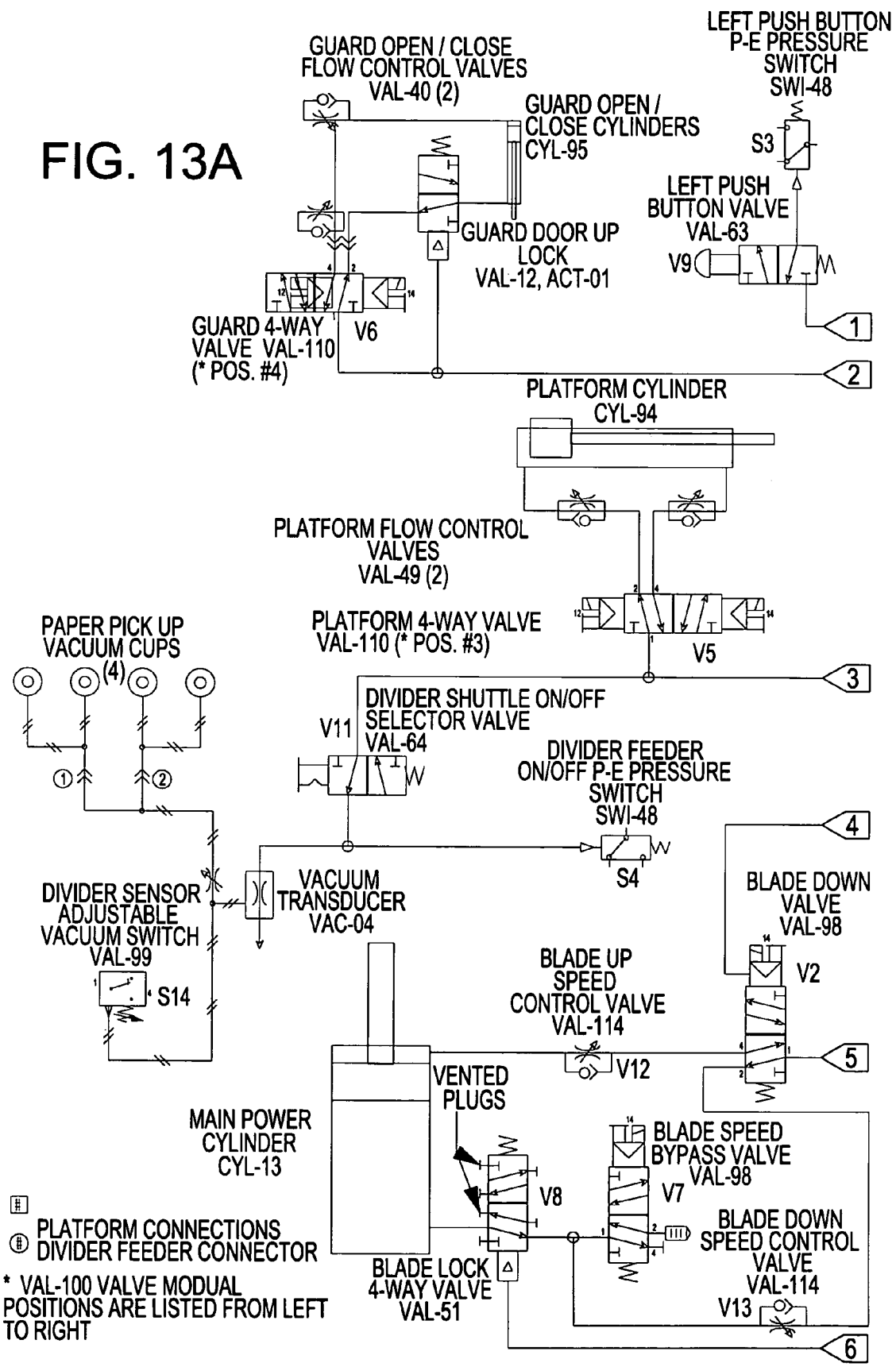
FIGS. 13A and 13B are a schematic diagram of the pneumatic operating system for the apparatus.
Figure 13B:
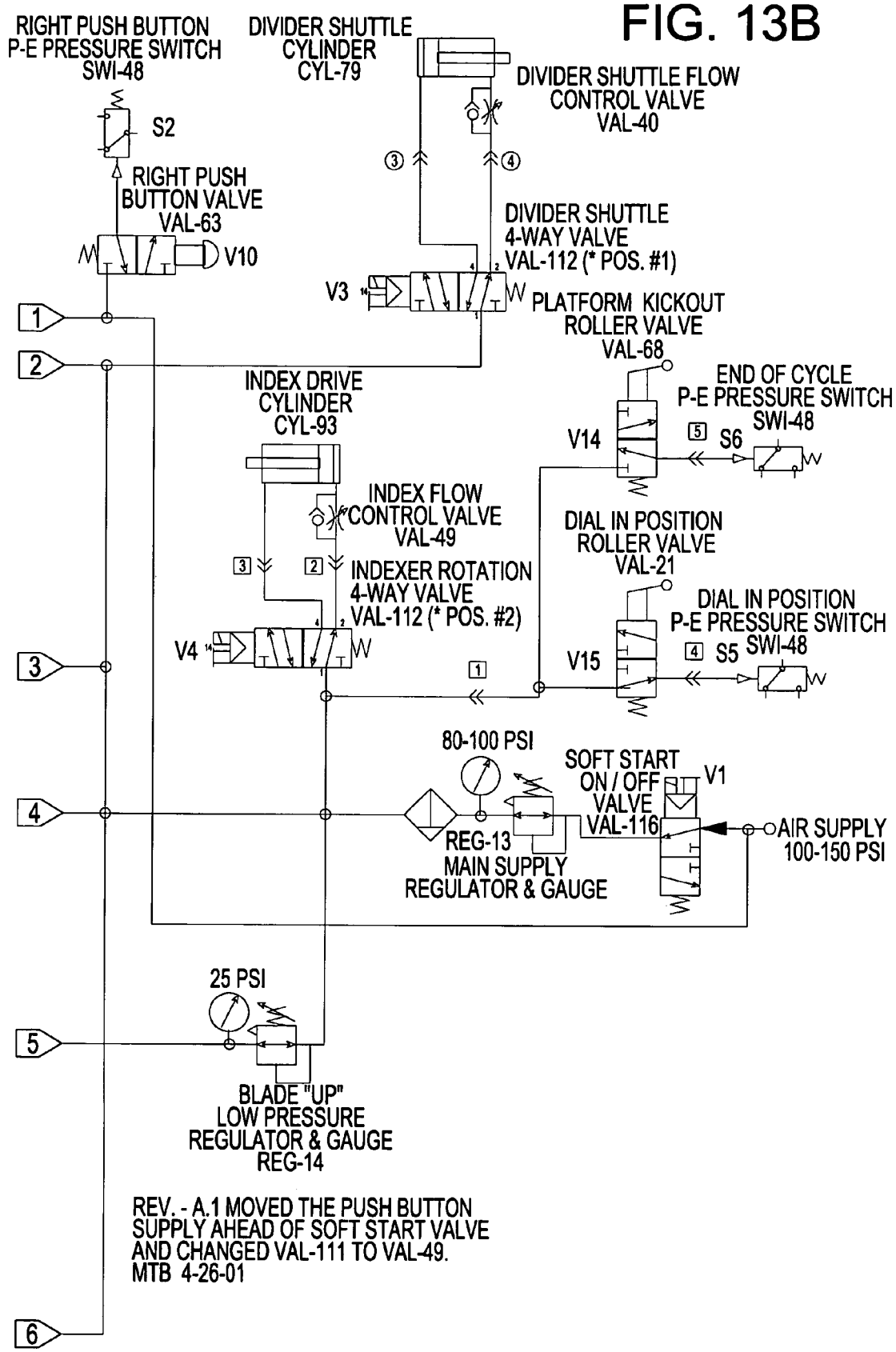

In the drawings the letter A indicates a food item such as a cake or other pastry that is to be cut. Support platform D for supporting the cake or pastry A is shown in FIGS. 3, 9, and 10. The platform or pallet D supports the pastry A both vertically and horizontally so that the pastry is ready to be cut, as seen in FIGS. 1-3.

A cutting blade which is designated by letter B is preferably integrally formed of titanium. Although at present a blade with thickness of one-fourth inch is being used in the apparatus, larger or smaller thicknesses may be selected. During cutting of the pastry or other food item the blade is preferably vibrated at a frequency not less than about 19,500 Hertz. The blade B is driven in a downward movement by means not specifically shown, but which is known in the relevant art. In its cutting action it stops just short of the upper surface of the platform or pallet D.

Before the pastry A is cut, support plates C which form a divisible platform are positioned in an abutting relationship. The divisible platform preferably lies in a precisely horizontal plane, but such precise horizontal alignment may not be necessary. During the cutting movement of the blade, however, it is necessary to keep the divider or separater sheet out of the way. Toward that end, according to the present invention I provide the divisible platform which opens to permit unobstructed downward travel of the blade between the two separate parts of the platform. While the blade is returning to its upwardly retracted position the platform C closes and its two parts return to their abutting relationship. A divider or separator sheet may then be brought into position.

A paper dispenser or tray G associated with one side of the divisible platform as shown on the right hand side of the drawing figures stores a stack of divider sheets F. The paper tray may if desired be directly attached to an associated side of the platform.

The camming mechanisms H includes means operative during the downward cutting stroke of the blade for creating a gap in the horizontal platform C directly beneath the blade edge. The gap is created by two separate cam assemblies H which are attached to corresponding separate parts of the platform C, behind feed mechanism and tray G.

Figure 6:
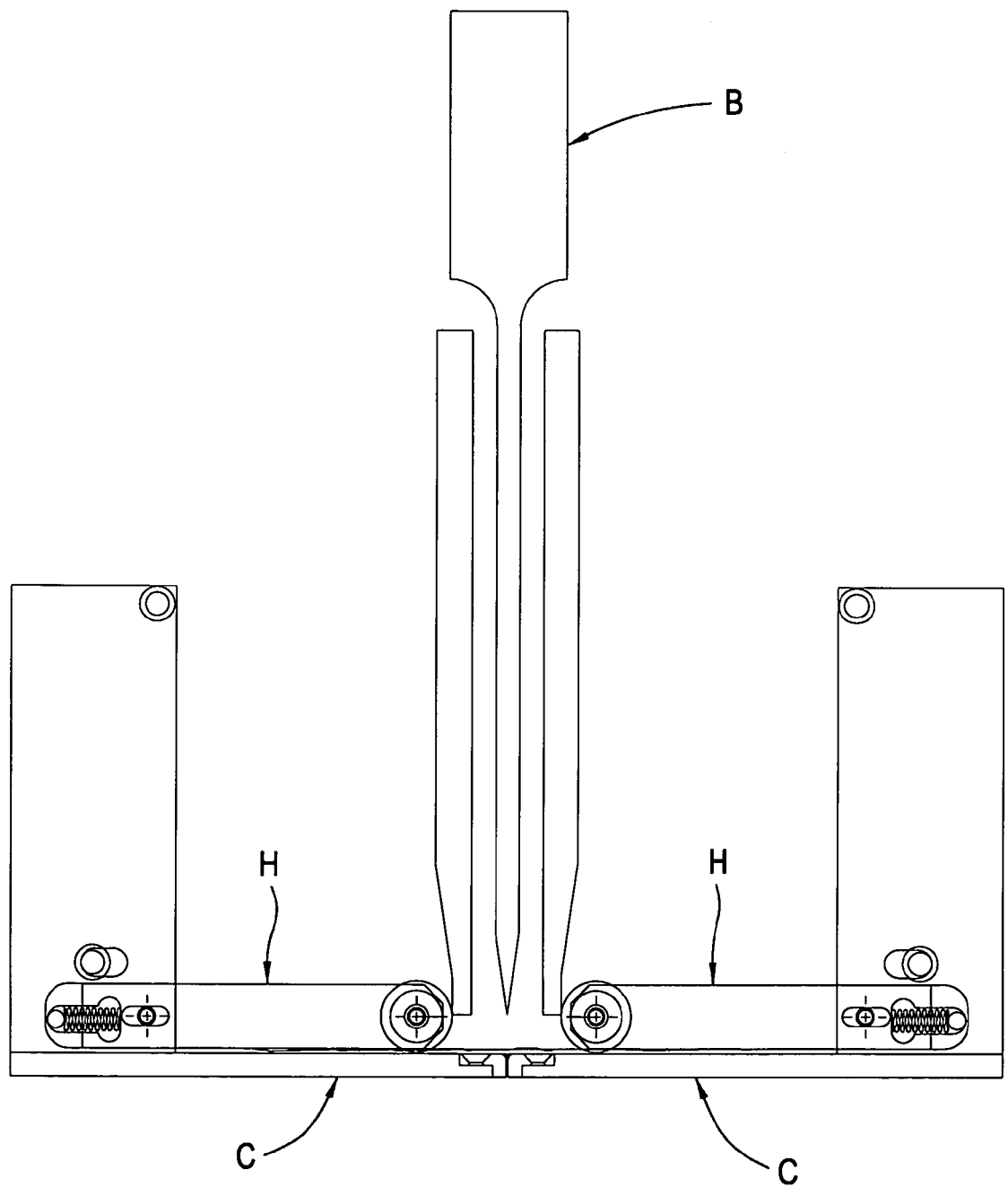
FIG. 6 is a schematic elevational view that illustrates the positioning of the cam assemblies and paper support plates before the cutting blade moves into a cutting position.
Figure 7:
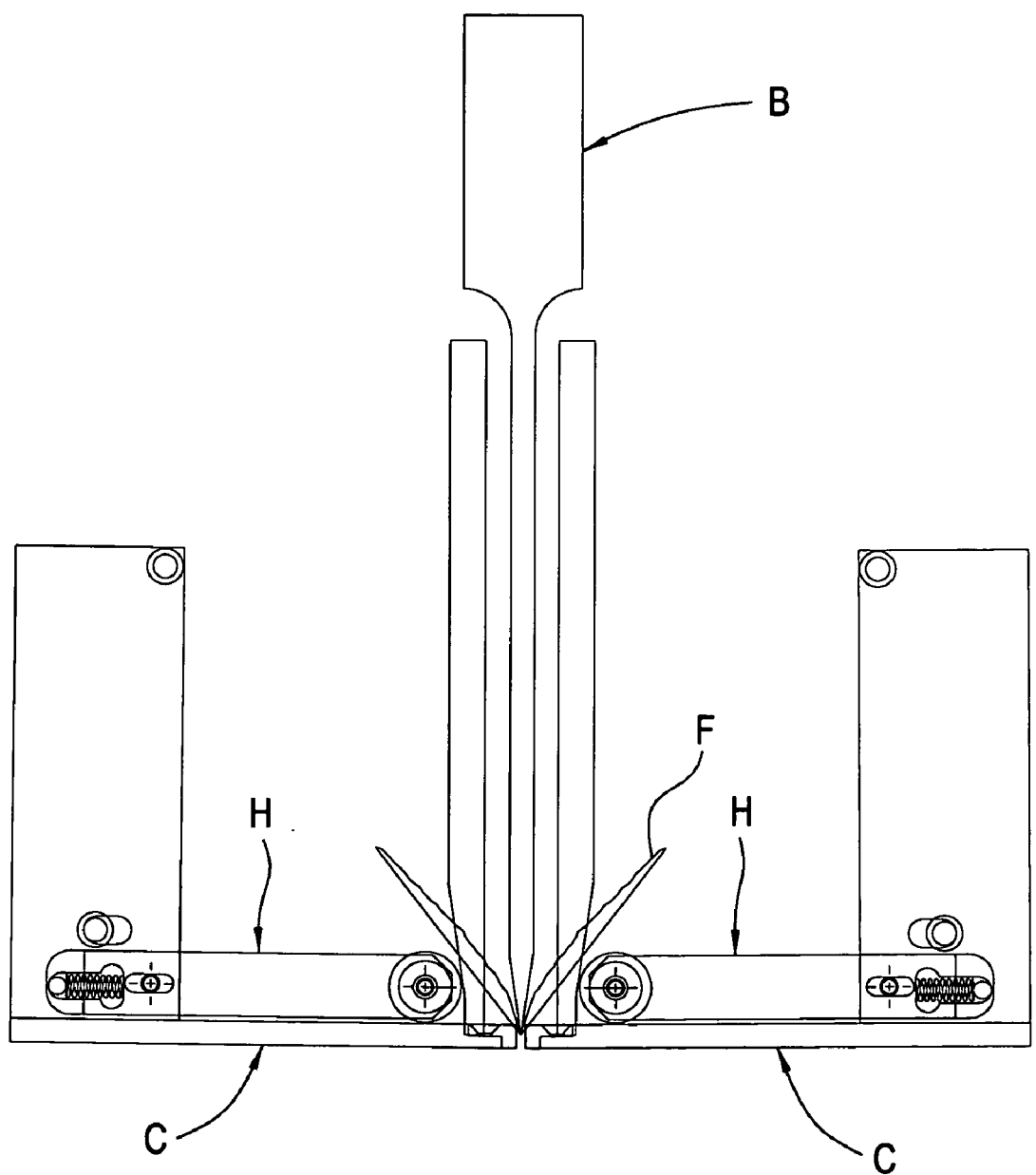
FIG. 7 illustrates initial separation of the cam assemblies and support plates and the initial creasing of a divider sheet along a predetermined fold line that was placed immediately underneath the cutting edge of the cutting blade.
Figure 8:
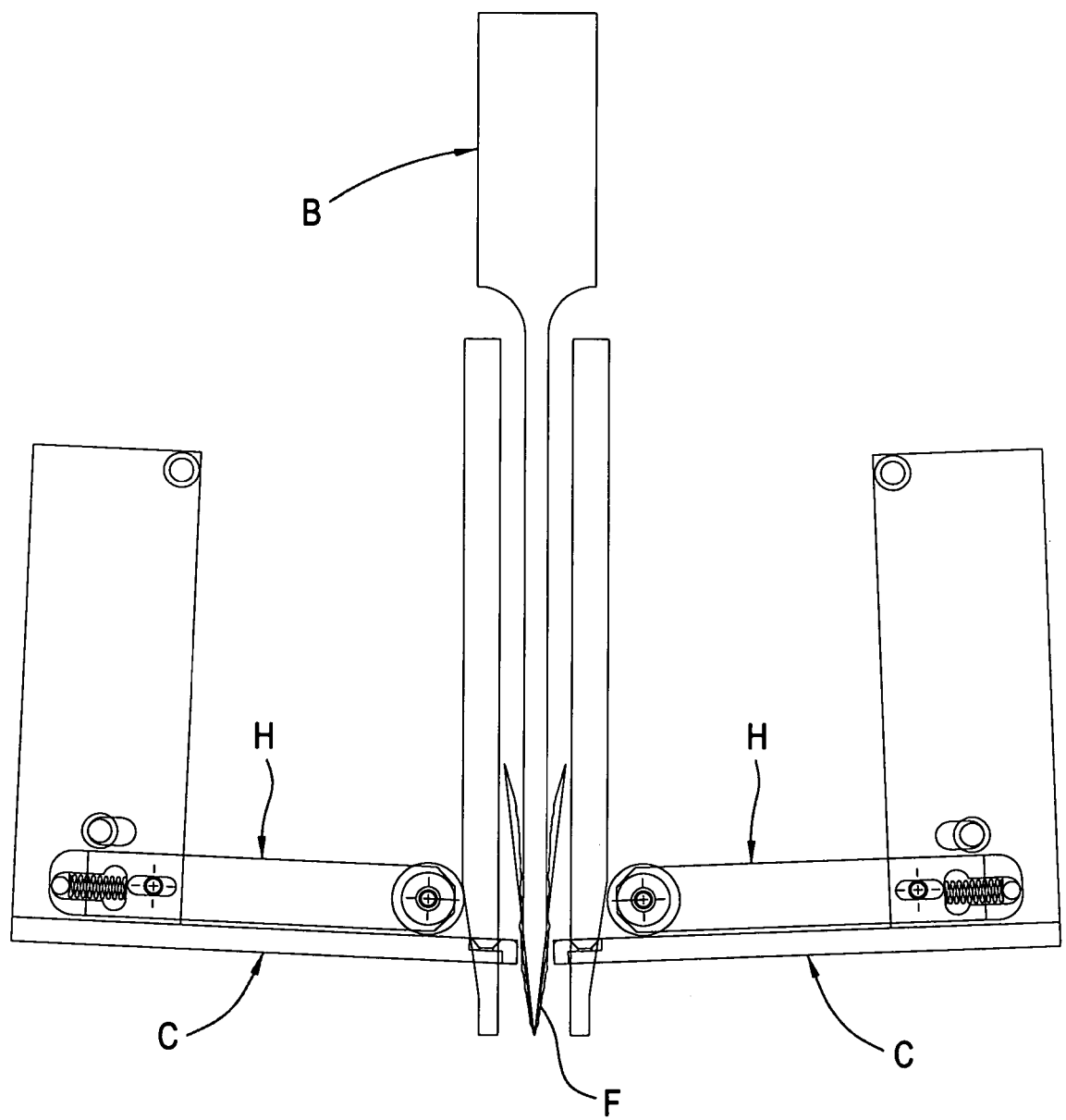
FIG. 8 shows the further separation of the cams and the final folding action of the divider sheet.

The cam assemblies may be more precisely described as assemblies of levers and wedges. The wedges of the camming mechanisms H are attached to the rear of the blade and aligned with the lever wheels (FIGS. 6-8). An associated control apparatus concurrently drives the blade even further downward to cut the food item A. The blade edge then stops just short of the upper surface of pallet or platform P.

Figure 4:
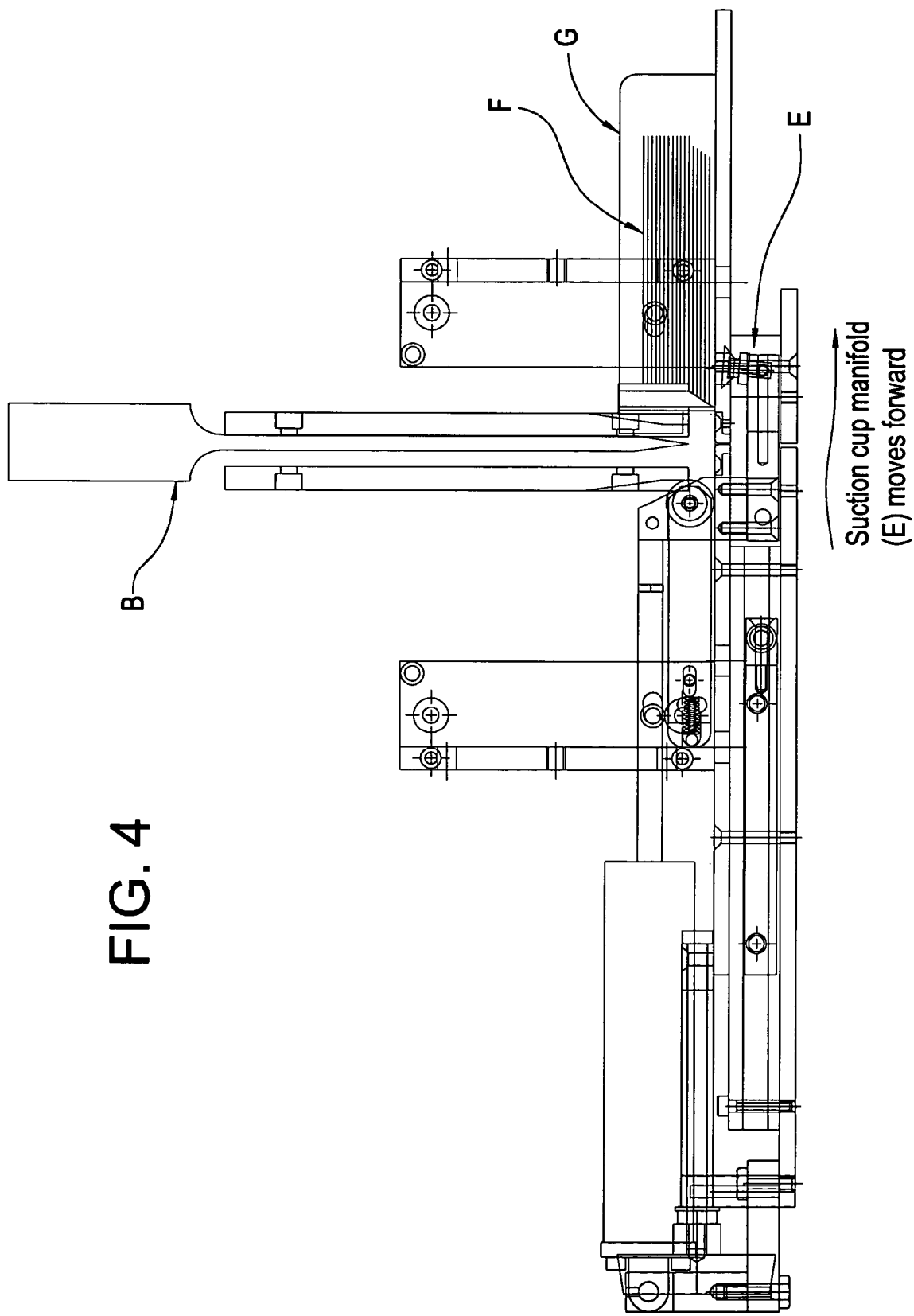
FIG. 4 is a view similar to FIG. 1, but showing the paper feeder as it moves its suction cup toward the under side of the paper tray to engage a divider sheet and pull it into position.
Figure 5:
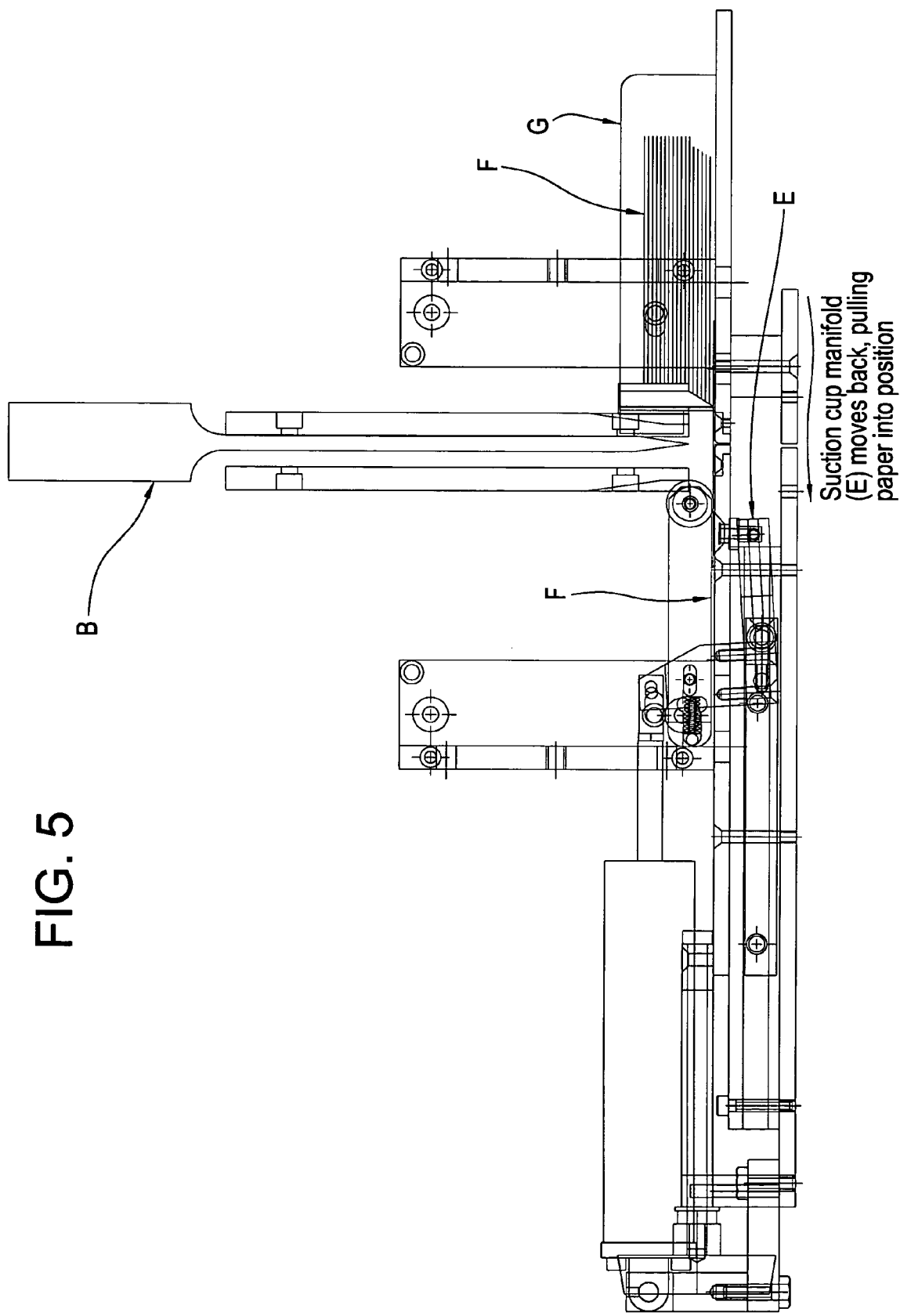
FIG. 5 is a view similar to FIG. 4 but showing the paper feeder in a partially retracted position after it has positioned the divider sheet underneath the cutting blade.

The divider shuttle and suction cup manifold, FIGS. 4 and 5, is part of the paper feed mechanism E for selecting and positioning a divider sheet from the paper supply tray G as each one is needed.

According to the present invention I provide a method of cutting a food item or pastry into separate portions and then inserting dividers between adjacent portions. First, I select a cutting blade that, when ultrasonically vibrated, is capable of cutting the food item across a major diameter. Then, I support the food item, preferably in a horizontal position. Then I apply ultrasonic energy to the blade, and while it is thus energized drive the blade in a first downward movement into the exposed upper surface of the food item to cut the food item in two. I then withdraw the blade from the cut until the cutting edge of the blade is spaced vertically away from the food item, but while also maintaining support of the now-separated parts of the food item. I then select a divider sheet and move it horizontally into the space between the blade edge and the food item, and then drive the blade in a second downward movement toward the food item so that the cutting edge of the blade engages the divider sheet immediately above the cut, and also causes the divider sheet to become folded along a line immediately underneath the cutting edge of the blade as the blade moves downward. It is of particular importance to continue the second downward movement of the blade to drive divider sheet into position between two adjacent portions of the food item, and to maintain ultrasonic energy to the blade until the blade is withdrawn from the divider.

More specifically, the apparatus includes a pair of opposed, horizontally reciprocable cams with paper support plates having flat upper surfaces. A control system for the apparatus includes means for moving the cams into abutting engagement so that their upper surfaces provide a continuous horizontal support base for a divider sheet.

The pair of paper support plates C on their upper surfaces then provide a platform for supporting a selected divider or separator sheet F. A pair of cams are slightly separated so that the divider sheet will first crease and then fold neatly along a predetermined fold line, as the cams are further separated while an associated control apparatus concurrently drives the blade even further downward.

Thus the cutting blade B has a cutting edge that is capable of cutting the food item. Horizontally reciprocable paper support plates C provide a horizontal platform for supporting a divider sheet. The overall feed mechanism in conjunction with the suction cup E provides the means for positioning a divider sheet upon the horizontal platform. As best shown in FIGS. 5 and 6, the feed system positions a divider sheet upon the support base with its predetermined fold line aligned with the abutting surfaces of the two cams.

The timing of the various actions is controlled by electronic circuitry which receives inputs from various position sensors, all as shown in detail in drawings FIGS. 11A, 11B, 12, 13A and 13B. Certain specific timing actions are selected to obtain the results that are most desirable or of highest quality.

The Novel Method

According to the presently preferred form of the invention a method is provided for cutting a food item into portions and then inserting dividers between adjacent portions. The cutting blade B is ultrasonically energized during a first cutting movement. The blade B is made to vibrate at a frequency that is preferably not less than about 19,500 Hertz.

The blade is then withdrawn while a divider sheet F is inserted between it and the food item. Although the food item has now been cut, the blade is then driven in a second movement to first crease and then fold the divider sheet and insert it into the previously made cut. As the blade continues its advance, the feeder mechanism separates the cams and moves them away from the blade to prevent contact with the blade while maintaining the sharp fold in the divider or separator sheet that was started by the initial contact with the blade edge.

During the second, or divider insertion movement, the blade is ultrasonically energized during at least the latter part of the second movement so as to effectively disengage blade B from divider sheet F. Again the blade is vibrating at a frequency that is preferably not less than about 19,500 Hertz. This achieves a superior cut, in that the ultrasonic blade makes a clean cut with minimum damage to the esthetics of the product before each divider or separator sheet is inserted into the cut.

While the presently preferred form of the invention has been disclosed in detail in order to comply with the patent laws, it will nevertheless be understood that many variations are possible, and the scope of the invention is to be determined only in accordance with the appended claims.

What I claim is:

1. Apparatus for cutting a food item into portions and then inserting dividers between its adjacent portions, comprising:
   a cutting blade having a cutting edge that is capable of cutting the food item;
   a horizontal platform for supporting a divider sheet;
   means for positioning a divider sheet upon the horizontal platform;
   means for driving the blade in a downward movement so that its cutting edge will engage the exposed upper surface of the divider sheet; and
   means for creating a gap in the horizontal platform directly beneath the blade edge while concurrently driving the blade even further downward so that the divider sheet will then fold neatly along a predetermined fold line.

2. Apparatus as in claim 1 wherein the cutting blade is capable of cutting the food item while being ultrasonically vibrated, and
   which further includes means for selectively applying ultrasonic energy to the blade.

3. Apparatus for folding a divider sheet neatly along a predetermined fold line, comprising:
   a pair of opposed, horizontally reciprocable cams adapted to cooperatively form a flat upper surface;

control means for moving the cams into abutting engagement so that their upper surfaces provide a continuous horizontal support base for a divider sheet;

means for positioning a divider sheet upon the support base with its predetermined fold line aligned with the abutting surfaces of the two cams;

means for driving a blade down upon the upper surface of the divider sheet to engage its predetermined fold line;

means for slightly separating the cams so that with further movement of the blade the divider sheet will then start to become folded along its predetermined fold line; and means for further separating the cams so that with still further downward movement of the blade the divider sheet may complete its folding movement.

* * * * *